United States Patent [19]

Picaud

[11] 4,381,055
[45] Apr. 26, 1983

[54] POLYVALENT SUSPENSION BALANCE FOR ASSEMBLY LINES FOR MANUFACTURED GOODS, ESPECIALLY MOTOR VEHICLES

[75] Inventor: Emile Picaud, Plaisir, France

[73] Assignee: Regie Nationale des Usines Renault, Boulogne-Billancourt, France

[21] Appl. No.: 242,673

[22] Filed: Mar. 11, 1981

[30] Foreign Application Priority Data

Apr. 2, 1980 [FR] France .................. 80 07463

[51] Int. Cl.³ .................................. B65G 49/00
[52] U.S. Cl. .................................. 198/653; 198/678; 269/46; 294/67 R
[58] Field of Search ............... 198/477, 478, 678, 680, 198/682, 653; 104/89, 94, 95; 105/154, 155, 148, 156; 294/82 AL, 67 R, 67 DB; 269/296, 71, 45, 46

[56] References Cited

U.S. PATENT DOCUMENTS 2,595,182  4/1952  Weingarten .................. 198/653 X
2,664,993  1/1954  Mullen et al. ................ 198/682
2,796,973  6/1957  Mullen et al. .

FOREIGN PATENT DOCUMENTS 765899   2/1954  Fed. Rep. of Germany .
2600348  7/1977  Fed. Rep. of Germany .
571013   5/1924  France .
2250597  6/1975  France .

*Primary Examiner*—Jeffrey V. Nase
*Assistant Examiner*—Dennis J. Williamson
*Attorney, Agent, or Firm*—Oblon, Fisher, Spivak, McClelland & Maier

[57] ABSTRACT

A polyvalent suspension balance for the assembly lines of manufactured goods, especially motor vehicles, involving at least one overhead device for coupling to an aerial conveyer drive is disclosed. The suspension balance consists of two vertical curved arms, shaped roughly like a wide-open C, each of which separately connects an overhead coupling piece to at least one lower and separate anchoring member for the substructure of the product to be assembled. The said curved arms are articulated about a more or less vertical axis which has great freedom of movement, thereby making it possible to gain easy access to all of the products during all stages of their assembly. Application is to assembly lines for relatively bulky and complex manufactured goods, especially to the production lines of motor vehicles.

2 Claims, 11 Drawing Figures

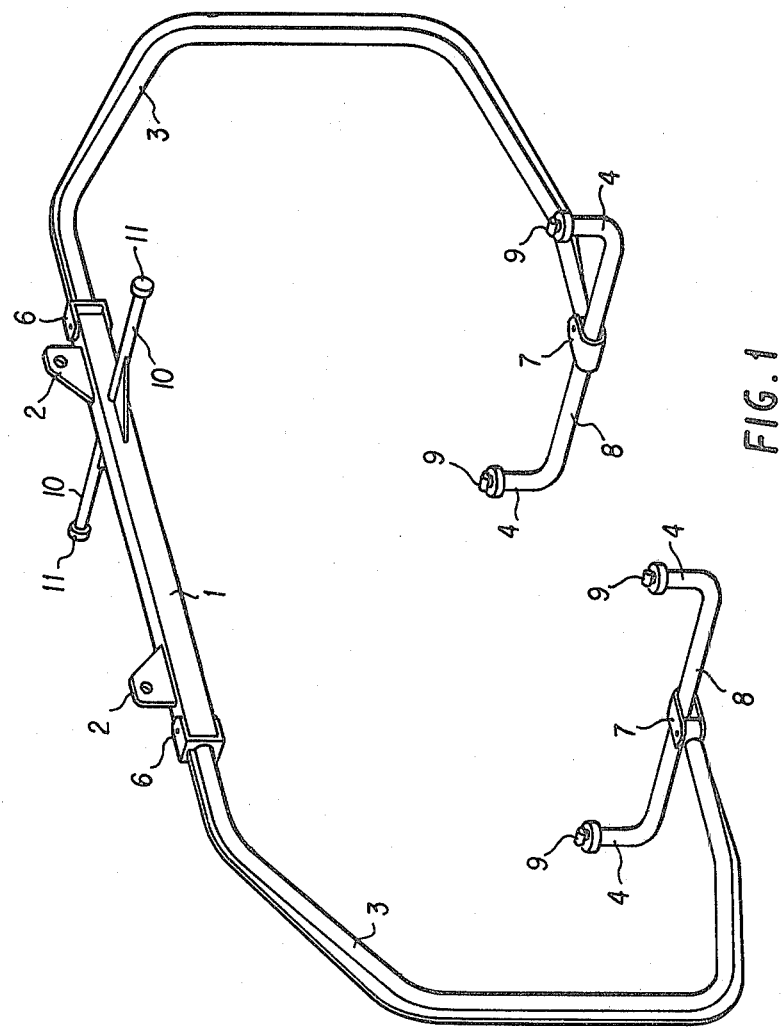

POLYVALENT SUSPENSION BALANCE FOR ASSEMBLY LINES FOR MANUFACTURED GOODS, ESPECIALLY MOTOR VEHICLES

BACKGROUND OF THE INVENTION

1. Field of the Invention

This invention concerns a polyvalent suspension balance for assembly lines for manufactured goods, especially assembly lines for the production of motor vehicles.

2. Description of the Prior Art

Experience has shown that a wide range of translation devices and systems are used in the production of certain relatively bulky and complex manufactured goods, in particular the production of motor vehicles from the initial assembly of the empty body until the vehicles emerge at the end of the finish assembly line. Accordingly, there is successive and/or alternate use of suspended conveyer belts and monorail circuits with tackle, suspension balances and swing trees, and of ground-level assembly lines or lines with tables, running wheels and guide tracks, both controlled or free wheeling, which may or may not involve the use of sleds, sledges, pushed or pulled wagons, etc. This results in the use of an extremely wide variety of materials, the moving portions of which must frequently be returned empty to the starting point of each assembly phase, giving rise to a large amount of mechanized or manual handling or maneuvering between the various segments of the assembly line and seriously impacting on the costs associated with design, construction, operation and maintenance of such production lines.

SUMMARY OF THE INVENTION

The object of this invention is to eliminate the aforementioned drawbacks by using one standard translation device for the entire assembly line, a device which is capable, however, of providing optimum freedom of access to the entire product throughout all its different assembly phases, access not only for the working personnel but for the mechanisms providing parts and tooling.

An aerial conveyer with suspension balances is the most appropriate translation system for meeting these criteria as it provides greater positioning flexibility in space, depending on needs, for the products to be assembled, thereby making all the manual operations to be carried out on these products ergonomically feasible at a normal human height, this without recourse to substantial civil engineering efforts in the course of constructing the production line. In addition, given the smaller investments and lesser degree of technical competence associated with such an installation, it is particularly well suited for the construction of assembly plants in the developing countries.

A polyvalent suspension balance for the assembly lines of manufactured goods, especially motor vehicles, involving at least one overhead device for coupling to an aerial conveyer drive in accordance with the object of this invention, consists in two vertical curved arms, shaped roughly like a wide open C, each of which separately connects an overhead coupling piece to at least one lower and separate anchoring member for the substructure of the product to be assembled, said C-shaped arms being articulated independently about a more or less vertical axis which provides great freedom of movement thereby making it possible to gain easy access to all of said products during all stages of their assembly.

According to a preferred assembly mode for the invention, each of the C-shaped arms, situated respectively at the front and rear of the suspension balance, is mounted so as to pivot directly to the overhead coupling piece and is articulated at its lower end to the center of a separate pair of anchoring members, with the connecting piece between said pairs of anchoring members during use consisting solely of the substructure of the product to be assembled, thereby ensuring great accessibility to the underneath portions of said assembled structure.

For safety purposes, each anchoring member is provided with a means for locking the substructure of the products to be assembled to the aforementioned suspension balance.

Preferably, each locking device consists of a rotary lock featuring a head with a known shape, roughly that of a parallelpiped so as to interlock in the appropriate housings in the substructure of the products to be assembled, which is caused to rotate by the interaction of an uninterrupted series of four saw-toothed control notches in the lateral surface of the cylindrical pivoting surface of the lock with at least one radial pin made unitary with a sliding ring mounted vertically around the body of the lock, so that each rising movement in said sliding ring induces one fourth of a turn of the head of the lock.

As a result, the lifting of the sliding ring which induces rotation in the head of the lock may be ensured automatically by the presence of abutments or stops placed judiciously at the appropriate locations along the assembly line, thereby bringing about the locking and unlocking of the products to be assembled.

When the products to be assembled are motor vehicles, the housings in the substructure of the vehicles for the anchoring and locking members may advantageously consist of the jack positioning and placement housings in the chassis frame.

Finally, according to a preferred variant of manufacture, the overhead coupling part includes a transverse horizontal bar with freely rotating rollers at each of its ends, which form a horizontal stabilizer by working in a known manner in conjunction with the lateral guide rails made unitary with the support structure of the aerial conveyer so as to prevent any rocking of the unit during work on the products during assembly.

BRIEF DESCRIPTION OF THE DRAWINGS

Various other objects, features and attendant advantages of the present invention will be more appreciated as the same becomes better understood from the following detailed description when considered in connection with the accompanying drawings wherein like reference characters designate like or corresponding parts throughout the several views, and wherein:

FIG. 1 is an orthogonal view from above of a polyvalent suspension balance according to the invention;

DETAILED DESCRIPTION OF THE PREFERRED EMBODIMENTS

Figure 2A:
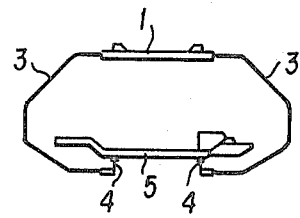
FIGS. 2a to 2f are schematic elevation views of successive stages in the assembly of a motor vehicle using a polyvalent suspension balance according to the invention.
Figure 2B:
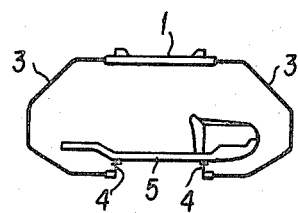
Figure 2C:
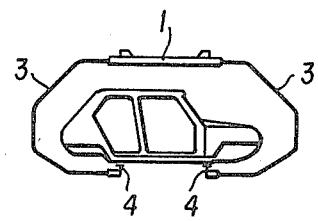
Figure 2D:
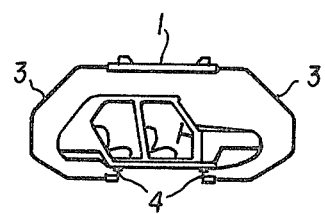
Figure 2E:
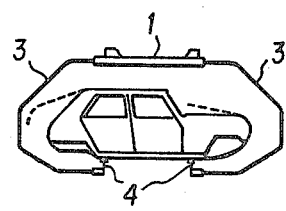
Figure 2F:
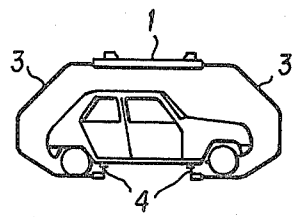

As shown in FIG. 1 in particular, the suspension balance consists of an overhead coupling piece 1 attached with the help of appropriate brackets 2 to any type of aerial conveyer drive device. Two vertical arms 3, shaped roughly like a wide-open C, are situated at the front and rear respectively, of the suspension balance, each of which separately links the overhead coupling piece 1 to a separate pair of anchoring members 4 for the substructure of the product to be assembled, which in the case of FIGS. 2a to 2f consists of the chassis frame 5 of a motor vehicle. Each of the C-shaped arms 3 is mounted so as to respectively pivot on the overhead coupling piece 1 via a first joint 6. At the lower end of each arm 3 is a second joint 7 which is at the center of a linking tube 8 raised at its end so as to define each separate pair of anchoring members 4.

The C-shaped arms 3 are thus independently articulated around vertical axes with large angular freedom of movement, on the order of 180 degrees, thereby allowing, as clearly shown in FIGS. 2a to 2f, easy access to the entire product being assembled, in this case motor vehicles, during the entire assembly process. In addition, the single connecting and stiffening element between the separate pairs of anchoring members 4 consists uniquely, during use, of the substructure 5 of the product to be assembled, likewise ensuring a high degree of access to the lower parts of said structure while eliminating weight from the suspension balances on their return circuit when empty.

Generally speaking, in their normal position the C-shaped arms 3 are in plane symmetrical with the suspension balance and work may be carried out with no difficulty on about 95 percent of the total surface area of the products to be assembled. Further, a slight movement of the arms 3, imparted manually by an operator or by an appropriate arrangement installed at the desired location along the assembly line, is sufficient to provide access to the remaining 5 percent. Nevertheless, the large freedom of movement of the C-shaped arms 3 proves to be very useful for entirely freeing the front or rear portion of the products to be assembled, especially when large-sized parts are added or in order to facilitate separation of the completed products at the end of the assembly line.

For safety purposes, each anchoring member 4 is provided with a locking device 9 for attaching the substructure 5 of the products to be assembled to the suspension balance. In addition, the overhead coupling piece 1 includes a transverse horizontal bar 10 provided with freely rotating rollers 11 at each end, forming a horizontal stabilizer by a known method of interaction between the said rollers 11 and the lateral guide rails (not shown) formed unitarily with the structure supporting the aerial conveyer so as to prevent any rocking of the entire unit during the manual or automated operations carried out on the products during assembly.

Figure 3:
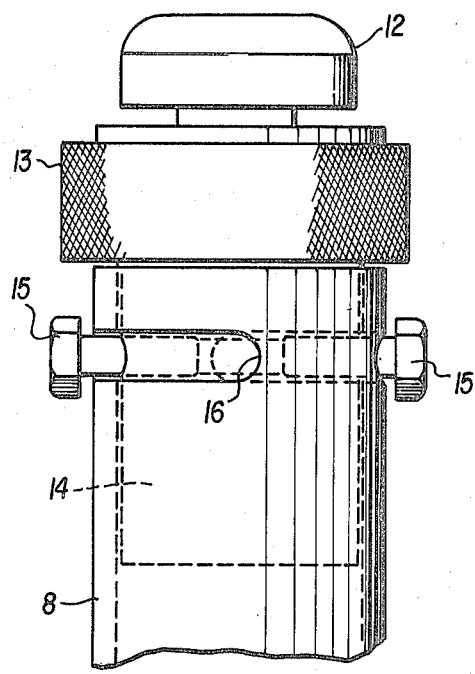
FIGS. 3 and 4 are elevation and plan views, respectively, of a first structure for locking the products to be assembled onto the polyvalent suspension balance according to the invention.
Figure 4:
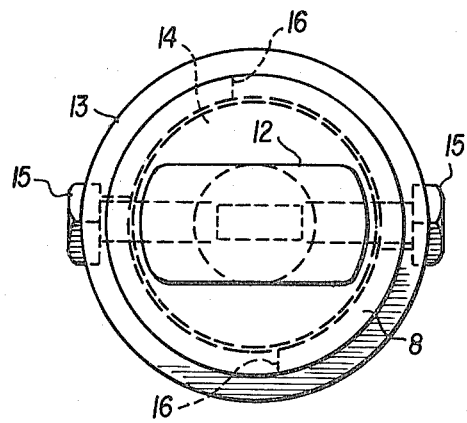

For installations which are small in size, the locking device 9 may be a manually activated rotary lock of the type shown in FIGS. 3 and 4, which includes a head 12, of a known more or less parallelpiped shape designed to interlock in an appropriate housing of the substructure 5 of the product to be assembled, and provided with a knurled lower collar 13 such that it can be rotated 90 degrees in alternate directions. The heads are extended by a cylindrical pin 14, which may turn in each upper end of the connecting tubes 8 making up the pairs of anchoring members 4. The heads are limited in translation and rotation by the interaction of stops 15, which are screwed radially into the cylindrical pin 14, and corresponding horizontal openings 16, each of which extends about a fourth of the way around the tubes 8 close to the ends thereof, so as to allow only a one quarter turn in rotation of the lock heads 12.

Figure 5:
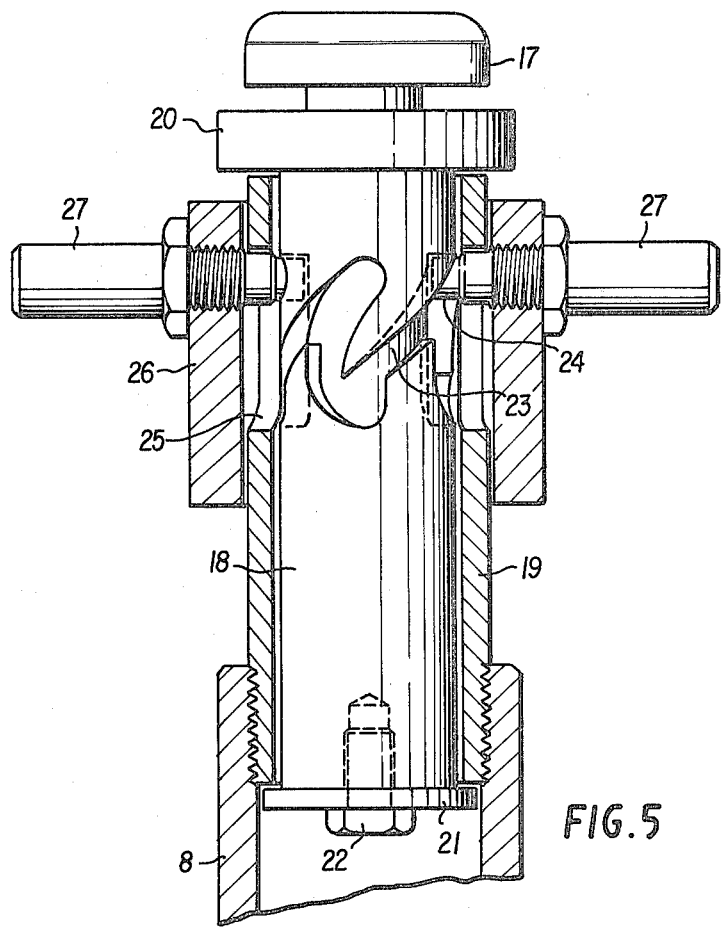
FIGS. 5 and 6 are elevation and plan views, respectively, of a second structure for locking the products to be assembled onto the polyvalent suspension balance according to the invention.
Figure 6:
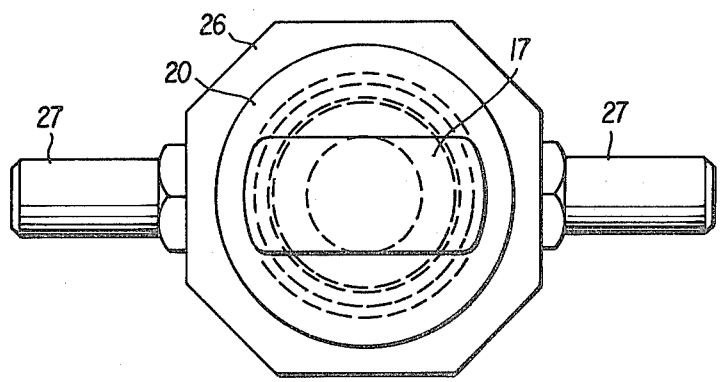

According to a preferred mode of manufacture of the locking device 9, shown in FIGS. 5 and 6, the locking device also consists of a rotary lock made up of a head 17 whose shape is similar to that of the preceding lock, extended by a cylindrical pin 18, mounted in free rotation inside a tubular lock body 19 screwed into the ends of the tubes 8 of the anchoring points 4 and axially immobilized in the said lock body 19 by the simultaneous action of an upper support ring 20 and a lower stop washer axially screwed at 22 into the cylindrical pin 18. The lock head 17 is caused to rotate by the interaction of an uninterrupted series of four saw-toothed control steps 23, made in the lateral surface of the pin 18, with two diametrically opposed pins 24, which slide within the corresponding vertical openings 25 made in the lock body 19 and which move unitarily with a vertically sliding ring 26 mounted around the lock body 19 so that each lifting of the said ring 26 induces a one quarter turn rotation of the lock head 17.

Each pin 24 also involves an extension 27 which protrudes beyond the sliding ring 26, forming a control organ for the locking device. The lifting of the sliding ring which includes the rotation of the lock head 17 may thus, thanks to this control organ, be provided either manually or automatically by the interaction of the extensions 27 with retractable stops or notches which are arranged at appropriate points along the assembly line.

When the products to be assembled are motor vehicles, as shown in FIGS. 2a to 2f, the housings in their substructure for the anchoring members 4 and locking units 9 may advantageously be the receptor and positioning housings for jacks on the underside of the chassis frame.

The polyvalent suspension balance which is the subject of this invention thus provides, by simple, reliable and inexpensive means, optimal accessibility to all parts of the products to be assembled, throughout the different phases of their manufacture, whether such access is for operators or for the devices providing parts and tooling. It thus lends itself both to use on relatively rudimentary assembly lines involving mostly manual operations and to highly automated assembly lines which require, for example, great freedom of access and movement for the arms of programmable automated equipment, in that each suspension balance may easily be effectively immobilized and stabilized by appropriate means, associated with the horizontal stabilizer described above or with some other feature, during the time of operation of the automated equipment.

The range of application of the present invention is not limited to the assembly lines for motor vehicles, but, as previously noted, may extend to all production lines for manufactured goods, especially those which are relatively bulky and complex. Likewise, various modifications may be made to the mode of manufacture described without thereby departing from the framework of the invention. Accordingly, for example, the locking devices 9 may be provided with seals which ensure they are protected when the suspension balances pass through installations for treating the surface of the products to be assembled.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A polyvalent suspension structure for the assembly lines of manufactured goods, comprising:
   an overhead support means supported and driven by a conveyor and having two ends;
   a vertically oriented curved arm, having one end thereof pivotally connected about a vertical axis at each said end of said coupling means, said arms and coupling means forming a C shape; and
   an anchoring member pivoted to the other end of each said arm, about said respective vertical axis of each said arm, said anchoring members being adapted for securement to the article to be manufactured, whereby each of said arms can pivot about said respective vertical axis to provide access to said article to be manufactured.

2. The structure of claim 1 wherein said anchoring members include anchoring means adapted to be connected to the underside of said article to be manufactured, said article being the only connection between said anchoring members.

* * * * *